Dec. 3, 1968     A. L. SPEASE, JR     3,413,870
REMOTE CONTROL LINKAGE MECHANISM FOR MULTIPLE
RATIO VEHICLE TRANSMISSIONS
Filed Nov. 10, 1966     7 Sheets-Sheet 1

INVENTOR:
ARTHUR L. SPEASE, Jr.
BY
ATTORNEYS

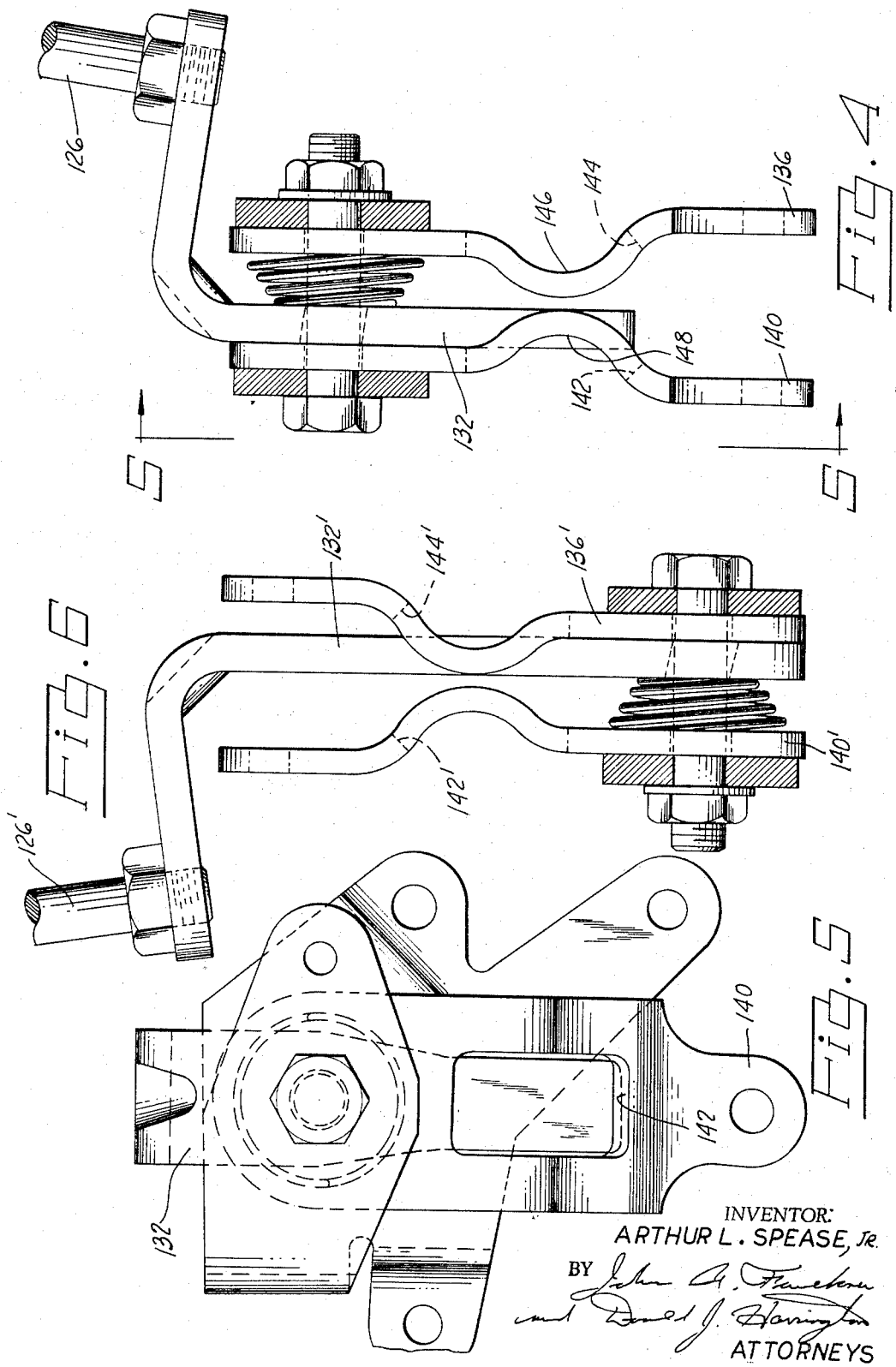

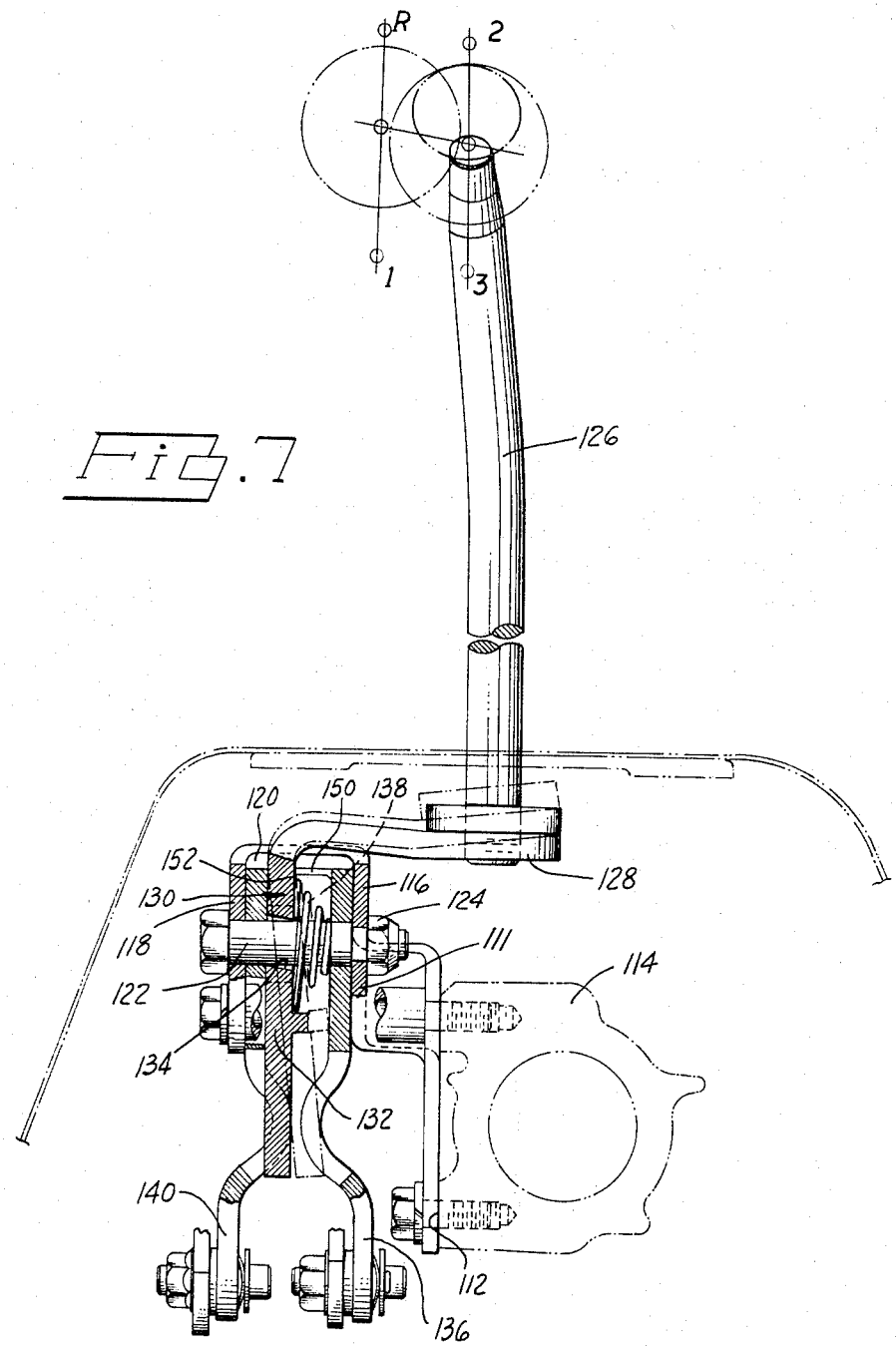

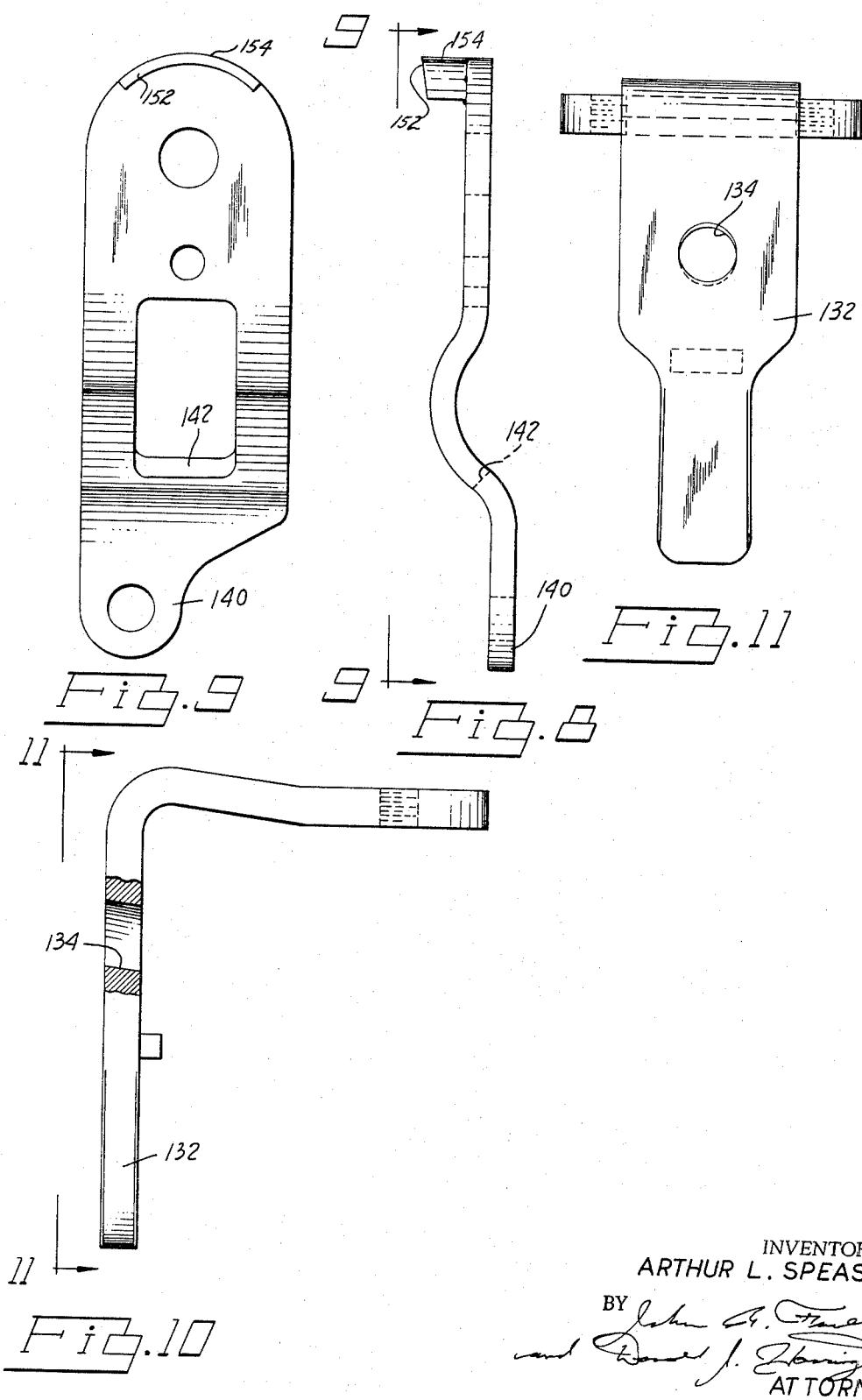

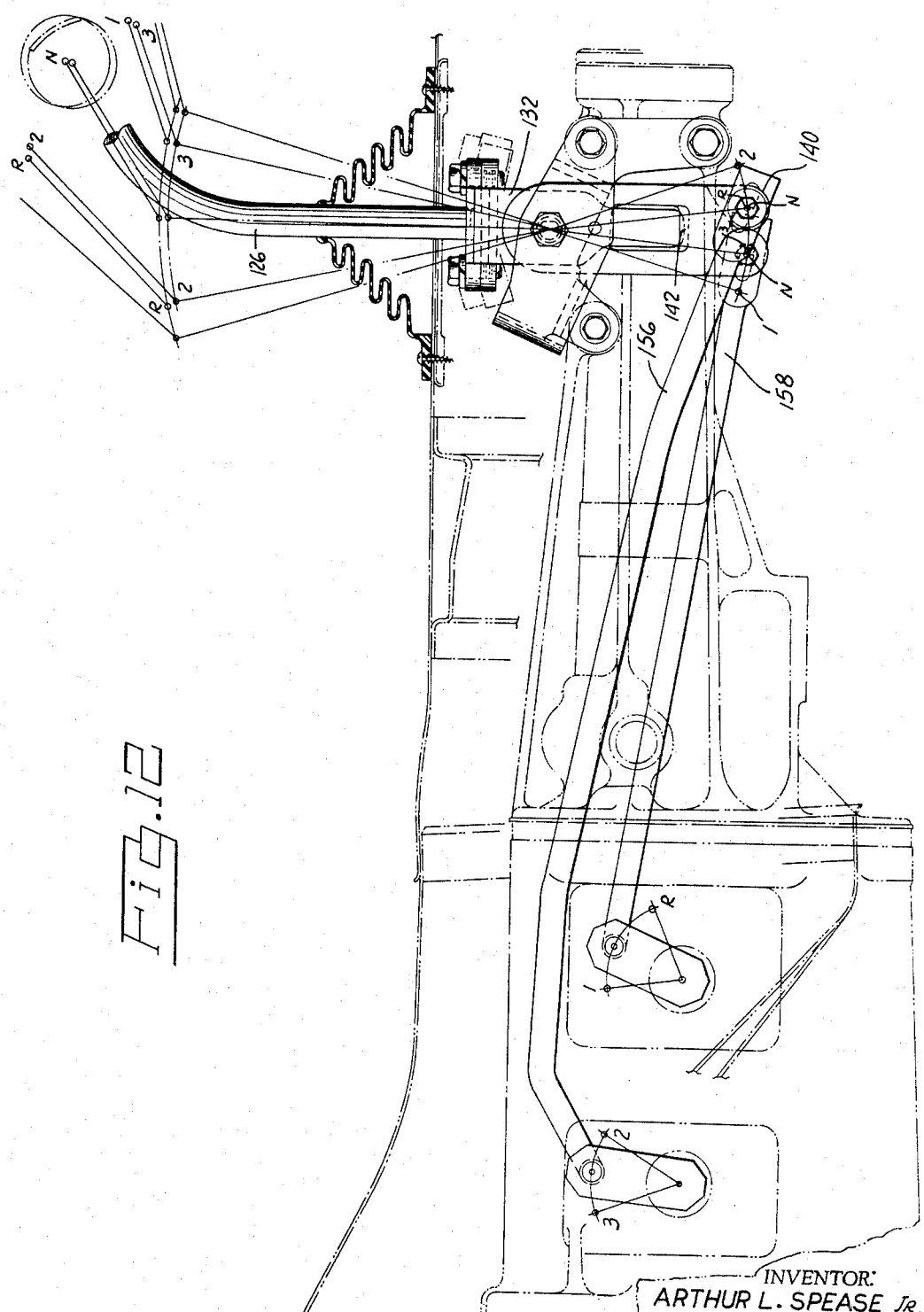

United States Patent Office 3,413,870
Patented Dec. 3, 1968

3,413,870
REMOTE CONTROL LINKAGE MECHANISM FOR MULTIPLE RATIO VEHICLE TRANSMISSIONS
Arthur L. Spease, Jr., Dearborn Heights, Mich., assignor to Ford Motor Company, Dearborn, Mich., a corporation of Delaware
Filed Nov. 10, 1966, Ser. No. 593,453
4 Claims. (Cl. 74—475)

ABSTRACT OF THE DISCLOSURE

A transmission ratio-controlling linkage comprising multiple shift levers mounted for oscillation about a common axis and a driver actuated selector lever mounted for oscillation on said common axis to permit adjustment thereof in transverse planes as the shift levers are selected during a transmission ratio shifting sequence.

My invention relates generally to remote control mechanisms that include personally operable members capable of selecting and actuating control levers which in turn are connected to controlled elements. My invention relates more particularly to a remote transmission shift control for a multiple-ratio, automotive vehicle transmission mechanism.

Manually controlled gearing for use in automotive vehicle drivelines includes multiple, geared, torque delivery paths that connect drivably the output member of a neutral clutch to the transmission tailshaft, the latter in turn being connected to the vehicle traction wheels through a drive shaft and a differential and axle assembly. The input member of the neutral clutch is connected to the engine crankshaft, and engagement and disengagement of the neutral clutch is accomplished by the vehicle operator in known sequential fashion during transmission speed-ratio changes.

The transmission mechanism includes either sliding gears or transmission synchronizer clutches that condition the torque transmitting gear elements of the transmission for torque delivery. The sliding gears or synchronizer clutches are actuated by shifter forks that in turn are operated by shift levers mounted externally of the transmission housing.

The ratio selector mechanism of my invention includes linkage elements carried by relatively stationary members, such as the transmission housing, and a driver-operated control lever that is adapted to be moved in a predetermined, ratio-selecting, shift pattern. Adjustment of the levers in the shift linkage occurs as the control lever selects any one of the shift levers and rotates them about a relatively fixed axis. The levers in turn are connected to the shift linkages that are mounted externally of the transmission housing. The driver-operated control lever extends from the lower chassis region of the vehicle into the vehicle passenger compartment.

It is an object of my invention to provide a remote control of the type above set forth which is characterized by its simplicity of construction and by non-critical tolerances in the relatively movable parts.

It is a further object of my invention to provide a remote transmission control for use in an automotive vehicle driveline having a manually-operated, multiple-ratio transmission wherein the shift levers, which are connected to the transmission mechanism, can be selected and actuated by a single driver operated control lever mounted pivotally for compound motion about an axis that is common to the axis of oscillation of the shift levers.

It is a further object of my invention to provide a remote transmission control of the type above set forth and which is characterized by a lack of vibration of the relatively movable elements of the linkage as the driveline is subjected to vibrations.

It is a further object of my invention to provide a shift linkage mechanism which can be adapted for either three-speed ratio transmissions or four-speed transmissions by varying the number of shift levers, all of said levers being adapted for oscillation about a common axis.

For the purpose of describing my invention more particularly, reference will be made to the accompanying drawings, wherein:

FIGURE 4 shows an assembly view, partially in section, of a gearshift linkage mechanism for a transmission having three forward driving ratios;

FIGURE 5 is a side view of the structure of FIGURE 4 as seen from the plane of section line 5—5 of FIGURE 4;

FIGURE 6 is a modification of the structure shown in FIGURE 4;

FIGURE 7 is an assembly view of an actual embodiment of the structure shown in FIGURE 4;

FIGURE 8 is a detailed view of the low speed and reverse lever of the structure of FIGURE 7;

FIGURE 9 is a side view of the lever of FIGURE 8;

FIGURE 10 is a portion of the manually operated gearshift lever of FIGURE 7;

FIGURE 11 is an end view of the lever of FIGURE 10; and

FIGURE 12 is a side elevation view of the mechanism of FIGURE 7 as mounted on the side of the housing of a vehicle transmission.

Figure 1:
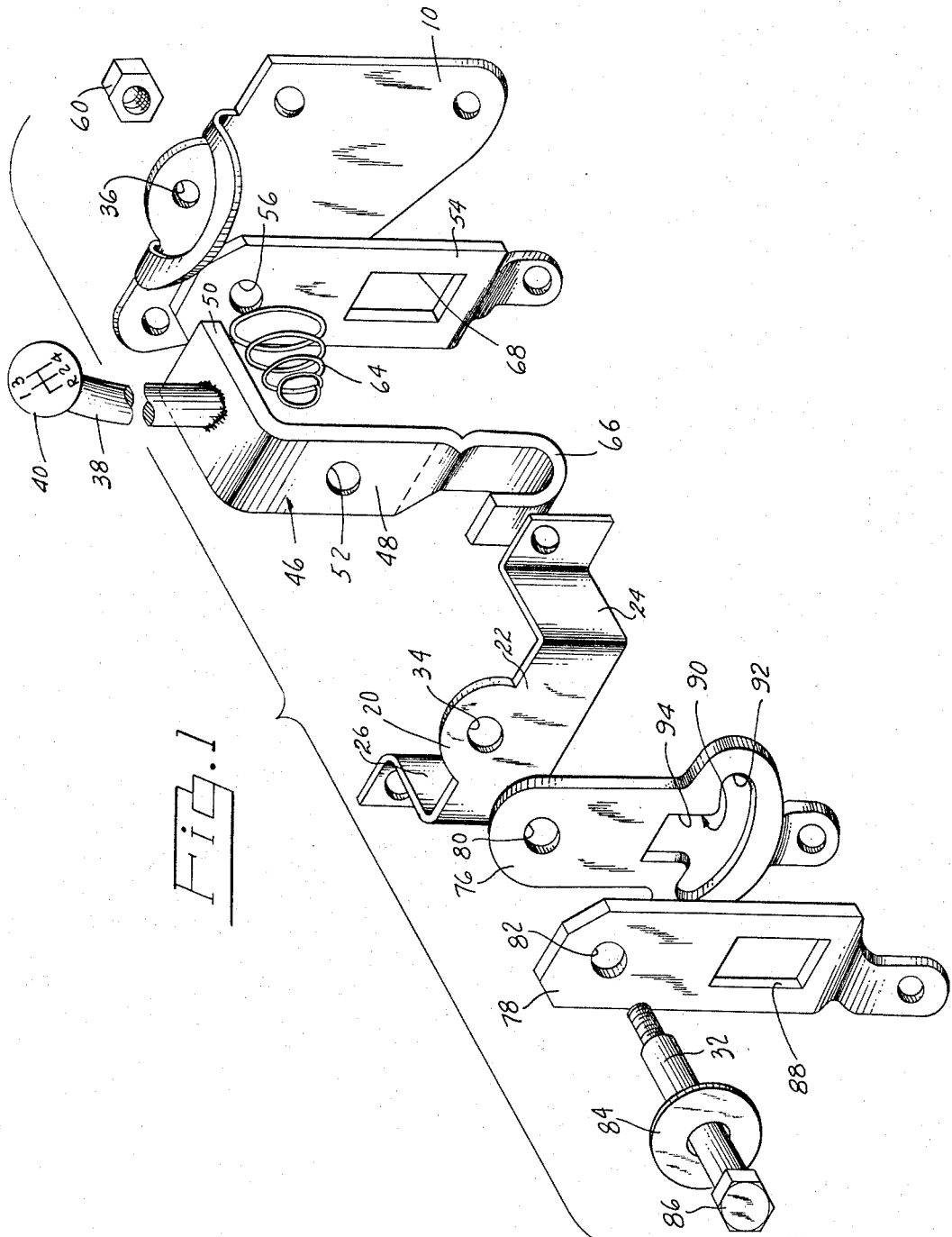
FIGURE 1 shows in schematic, isometric form a disassembled or exploded view of my gearshift linkage mechanism.
Figure 2:
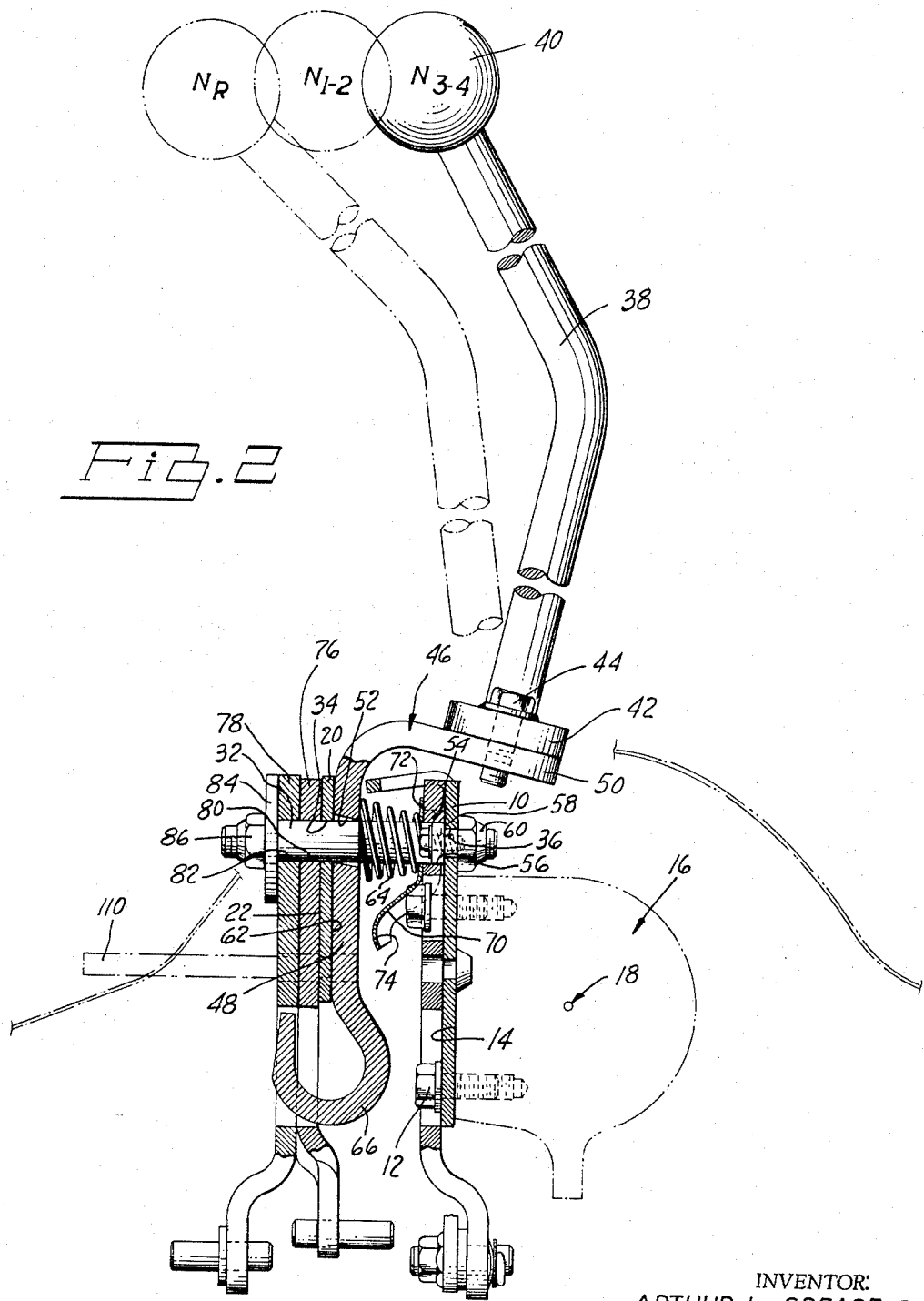
FIGURE 2 shows an assembly view, partly in section, of an improved gearshift linkage mechanism for a four-speed ratio transmission.

In FIGURES 1 and 2 numeral 10 designates a mounting bracket that can be secured by means of bolts 12 to the side face 14 of the transmission housing 16. The axis of the transmission, which extends perpendicularly with respect to the plane of FIGURE 2, is indicated at 18. A second mounting bracket 20, which is bolted to the bracket 10, includes a first portion situated in a plane parallel to the plane of bracket 10. As indicated in FIGURE 1, as well as in FIGURE 3, bracket 20 includes two spacer legs 24 and 26. These are secured by bolts 28 and 30, respectively, to the bracket 10.

A pivot shaft 32 extends through an opening 34 in the bracket 20 and through an opening 36 in the bracket 10.

A manually operated control lever is shown at 38. It extends in a generally vertical direction into the passenger compartment of the vehicle. Its upper end carries a hand grip 40 to facilitate manual shifting motion. The lower end of the shaft 38 is welded to a pedestal 42 which is bolted by bolts 44 to the upper end of a manual selector lever 46.

Lever 46 is comprised of a main portion 48, which is situated normally in a plane generally parallel to the plane of bracket 10. The upper end 50 of the lever 46 is offset in a transverse direction.

The main portion 48 of the lever 46 is provided with an opening 52 which receives the shaft 32. Opening 52 is formed with a diameter greater than the diameter of shaft 32. This will permit adjustment of the lever 46 in a plane that contains the plane of the axis of shaft 32. By preference, the opening 52 can be slanted so that the shaft 32 is adapted to contact the left-hand margin of the opening 52 on its lower side and to contact the right-hand margin of the opening 52 on its upper side. The lever 46 can be oscillated by the operator about the axis of the shaft 32, and it can be shifted also in a plane that contains the axis of shaft 32.

A reverse ratio shift lever 54 also in pivoted on shaft 32. Lever 54 is formed with an opening 56 through which the shaft 32 extends.

A shoulder 58 formed on shaft 32 engages the left side of the bracket 10. Shaft 32 is held fixed to the bracket 10 by retainer nut 60.

The main portion 48 of the lever 46 engages the right-hand face 62 of the bracket 20. It is urged into engagement with the face 62 by crossover spring 64.

The lower end 66 of the lever 46 is formed with a horseshoe-shape. The right-hand side of the end 66 normally is situated in alignment with an opening 68 in the lower portion of the reverse shift lever 54.

When the manually operated lever 38 is shifted in a plane that contains the axis of shaft 32, the end 66 will register with the opening 68. As the manually operated control lever 38 then is oscillated about the axis of shaft 32, end 66 will cause the reverse lever 54 to oscillate about the axis of shaft 32.

A detent plate element 70 is located between lever 54 and lever 46. It includes a circular base 72 through which the shaft 32 is received. It includes also a detent arm 74 which is adapted to be engaged by the portion 48 of the lever 46. The spring 64 urges the base 72 firmly against the left-hand surface of the reverse lever 54. The lever 46 will engage the arm 74 as the operator moves the end 66 toward the opening 68. Contact is made by the arm 74 just prior to registry of the end 66 with the opening 68. As motion of the end 66 toward the opening 68 continues, detent element 70 will introduce a resistance that must be overcome before a connection is made between the lever 38 and the lever 54.

The opening in the base 72 through which the shaft 32 extends is oversize, thereby allowing the element 70 to tilt with respect to the axis of the shaft 32 when it is engaged by the lever 46. Tilting motion occurs, however, against the opposing force of the spring 64.

The shaft 32 extends through the bracket 20. Its outermost end rotatably supports a 1–2 shift lever 76 and a 3–4 shift lever 78. These levers are formed with openings 80 and 82, respectively, through which the shaft 32 extends. The levers 76 and 78 are held axially fast between bracket 20 and a flat washer 84. The washer 84 is held against a shoulder formed with the left-hand side of the shaft 32 by means of a nut 86.

The lever 78 is formed with an opening 88 which is adapted to register with the left-hand side of the end 66 for the lever 46.

When the end 66 is shifted so that it is in alignment with opening 88, the operator can shift the lever 46 in a plane that contains the axis of shaft 32 and end 66, and opening 88 registers thereafter. If the operator rotates the lever 46 about the axis of shaft 32, the lever 78 will rotate.

Lever 76 is formed with an opening 90 which has a first arcuate-shaped part 92 and a generally rectangular-shaped part 94. The end 66 is adapted to extend through opening 90 when it registers the opening 88 in lever 78. Upon rotation of the lever 46 about the axis of shaft 32 when the end 66 is engaged with the opening 88, the end 66 will move through the arcuate-shaped portion 92 of the opening 90 so that motion of the lever 78 can occur independently of lever 76.

If the lever 46 is moved in the plane of the axis of shaft 32 until portion 48 engages the detent element 74, the left-hand part of the end 66 will have moved out of registry with the opening 88 and into registry with the portion 94 of the opening 90. If the lever 46 then is oscillated about the axis of shaft 32, lever 76 will be caused to move about its pivotal axis.

Figure 3:
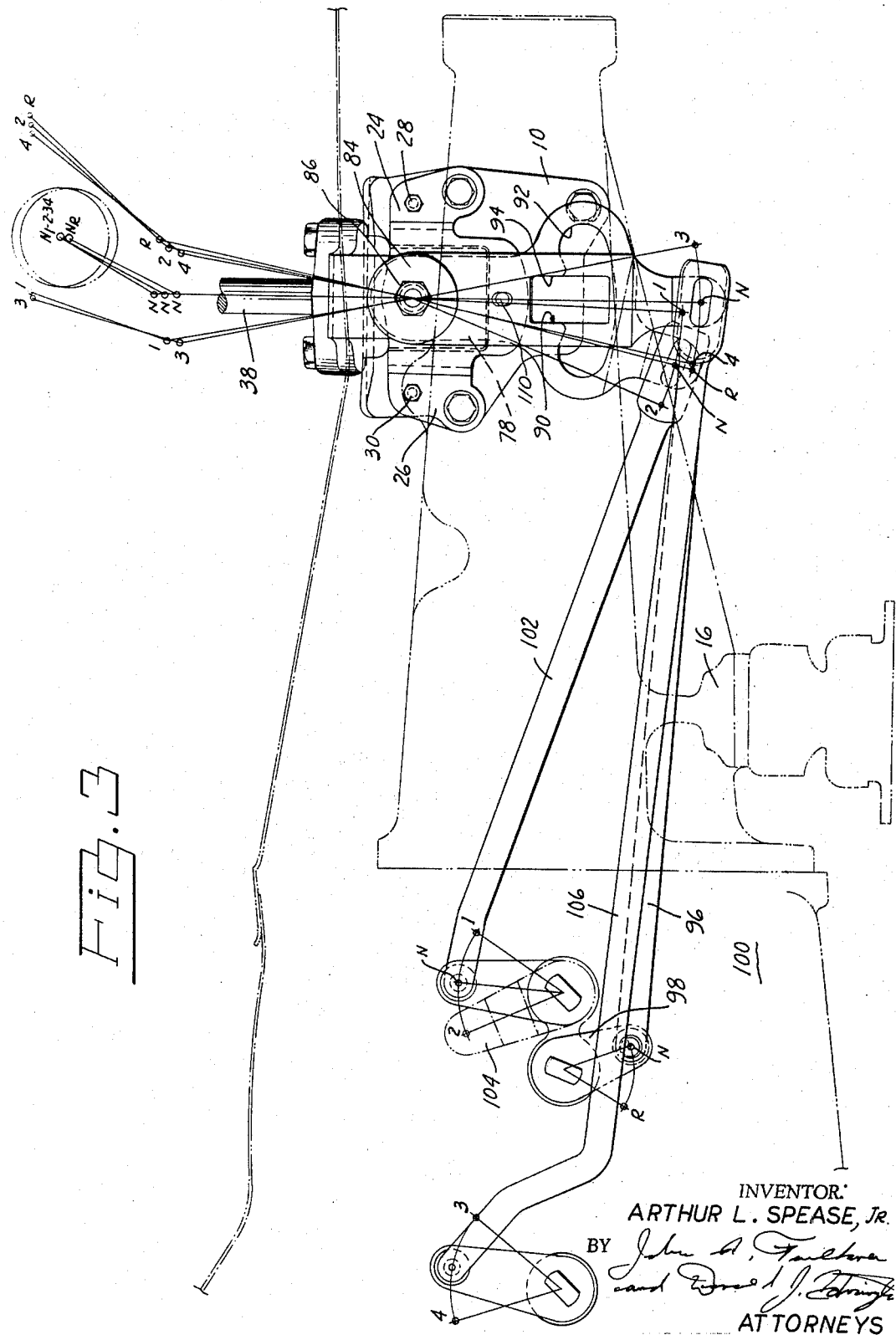
FIGURE 3 shows a side elevation view of a transmission mechanism on which the linkage mechanism of FIGURE 2 is mounted.

As indicated best in FIGURE 3, the reverse lever is connected pivotally to link 96, which in turn is connected to the transmission shift linkage 98 located on the exterior of the transmission housing 100. Housing 100 is connected by bolts to the transmission tailshaft housing 16.

The lower end of the lever 76 is connected by means of a rod or link 102 to the transmission shift lever 104. When this lever is moved in a counterclockwise direction, as viewed in FIGURE 3, the transmission will be conditioned for second speed ratio operation. Movement in a clockwise direction will condition the transmission for first speed ratio operation. When the lever 104 is moved to an intermediate angular position, the transmission will be conditioned for neutral.

Clockwise rotation of the reverse lever 98 will condition the transmission for reverse drive operation. Movement in a counterclockwise direction will condition the reverse drive gearing of the transmission for neutral.

Lever 78 is connected at its lower end to shift rod or link 106. The other end of the rod 106 is connected to transmission shift lever 108 which controls ratio shifts between the fourth speed ratio and the third speed ratio. Counterclockwise movement of the lever 108 will condition the transmission for fourth speed ratio operation, and clockwise rotation will condition the transmission for a third speed ratio operation. Neutral corresponds to a position intermediate the two extreme positions for the lever 108.

During assembly, the levers 78, 76, 46 and 54 are aligned by an alignment pin 110 which is adapted to extend through aligned openings formed in each of these levers. When the pin is in place, the rods 102, 106 and 96 can be assembled and connections made with the transmission shift levers. The levers at that time are positioned in the neutral position. After the connection is made, the pin 110 is removed and no further adjustment of the levers 78, 76 and 54 with respect to the transmission shift levers is required. The bracket 10 also has an opening that is situated in alignment with the openings formed in the levers for adjustment purposes.

In FIGURES 4 through 12 I have illustrated a shift linkage mechanism capable of being used with a three-speed ratio transmission rather than a four-speed ratio transmission. It comprises a bracket 111 which is adapted to be bolted to the face 112 of a boss formed on a transmission tailshaft housing 114. Bracket 111 generally is U-shaped and it includes a first wall 116, a second wall 118 in parallel disposition with respect to the wall 116, and a connecting wall 120. Walls 116 and 118 are formed with openings through which a mounting pin 122 is received. The pin is held fast by a locking nut 124.

The manually operated shift lever 126 extends vertically into the driver's compartment of the vehicle body. It is connected at its lower end to the upper extremity 128 of the manually controlled lever 130. The lever 130 includes a generally vertically positioned part 132 situated between the walls 116 and 118. It is formed with an opening 134 through which the pin 122 extends. The diameter of the opening 134 is slightly larger than the diameter of shaft 122 to permit oscillation of the lever 130 in a plane that contains the axis of pin 122. The left-hand corner of opening 134 engages the lower side of shaft 122 and the right-hand corner of opening 134 engages the upper side of pin 122.

A low-and-reverse shift lever 136 is situated between the walls 116 and 118. It contacts the inner surface of the wall 116 and is held against the wall 116 by a compression spring 138.

A 2–3 shift lever 140 also is pivoted on the pin 122. It is formed with an opening through which the pin 122 extends.

The upper end of the lever 140 is positioned directly between the portion 132 of lever 130 and the wall 118. Spring 138 exerts a constant biasing force on the lever 130 which holds it directly against the lever 140 and lever 140 in turn is held against wall 118 with the same biasing force.

The lower end of the portion 132 can be oscillated in a plane that contains the axis of pin 122. When it is moved in one direction, it is adapted to register with an opening 142 in lever 140. When it is oscillated in the other direction, it is adapted to register with opening 144 formed in lever 136. Lever 136 is formed with a curvature as shown at 146 in the region of the opening 144. A corresponding curvature shown at 148 is formed in the lever 140 in the region of the opening 142. This will permit the lower end of the lever portion 132 to register with the respective openings 142 and 144 as it is shifted by the operator.

FIGURES 10 and 11 show in more particular detail the configuration of the lever 130. The lower portion of the lever 130 that engages the openings 142 and 144 is of a reduced transverse dimension. FIGURES 8 and 9 show in more particular detail the characteristics of the lever 136. As seen from these views, lever 136 carries a stop 150 which is in the form of a segment of a tube. This tube is milled on a bias with respect to the axis of the tube thereby forming an upper shoulder 152. The shoulder 152 limits the clockwise motion of the lever 130 and eliminates excessive replay.

The lower ends of the levers 140 and 136 are connected respectively to shift rods 156 and 158. These in turn are connected respectively to the 2–3 transmission shift lever and the first-and-reverse shift lever, both shift levers being part of multiple ratio gearing.

FIGURES 4 and 5 show in schematic form the structure of FIGURES 7 and 12. FIGURE 6 on the other hand, shows in schematic form an alternate construction for the FIGURE 4 arrangement wherein the levers 136' and 140' are reversed so that they engage an intermediate part of the driver-operated lever 132'.

For purposes of clarity, the elements of the FIGURE 6 construction that have counterpart elements in the FIGURE 4 construction have been identified by similar reference characters although prime notations have been added. The connections between lever portion 132' and the shift levers 136' and 140' occur at a point intermediate the axis of oscillation and the connection with the driver-operated control lever 126'. The mode of operation of the FIGURE 6 construction is similar to that of FIGURE 4.

Having thus described preferred forms of my invention, what I claim and desire to secure by U.S. Letters Patent is:

1. A remote control linkage mechanism for transmitting motion from a personally operable lever to each of several control elements comprising a relatively stationary bracket, a pivot shaft connected to said bracket, actuating levers mounted for oscillation on said pivot shaft, each actuating lever extending in a common direction, the free ends of said actuating levers being connected to said control elements, a control lever connected directly to said personally operable lever and extending from said pivot shaft generally in the direction of said actuating levers, said control lever being mounted on said pivot shaft for oscillation in a first direction about the axis of said pivot shaft and for oscillation in a second direction in a plane that contains the axis of said pivot shaft and about an axis that intersects said pivot shaft and that is normal thereto, the free end of said control lever being displaced axially, openings formed in each of said actuating levers in alignment with said control lever, the end of said control lever being adapted to register selectively with each of said openings as it is oscillated from one position to the other in said second direction, said control lever and one of said actuating levers with which it registers oscillating in unison about the axis of said pivot shaft upon movement of said personally operable lever in a plane that is transverse to the axis of said pivot shaft, said mechanism comprising a compression spring situated between said control lever end and an adjacent actuating lever, thereby biasing said control lever into registry with another one of said actuating levers, said compression spring being a coil spring encircling said pivot shaft and engaging said control lever and an adjacent actuating lever whereby said control lever normally is biased toward the actuating lever most remote therefrom.

2. The combination as set forth in claim 1 wherein said mechanism includes a spring-loaded detent member having parts anchored to said bracket and another part engageable with said control lever as the latter is shifted from registry with one of said actuating levers into registry with a second one of said actuating levers, said detent member encircling said pivot shaft and being urged resiliently against said adjacent lever and having a part in the path of movement of said control lever, said detent member introducing a spring force of said control lever that opposes motion of said control lever into registry with said adjacent lever.

3. The combination as set forth in claim 2 wherein the opening in said second one of said other actuating levers comprises a clearance portion of relatively large width when measured in a plane transverse to the axis of said pivot shaft, the end of said control lever being situated in said clearance opening when it registers with the opening in said one of said other actuating levers whereby movement of each actuating lever can be accomplished independently upon rotation of said control element about the axis of said pivot shaft.

4. The combination as set forth in claim 1 wherein the opening in said second one of said other actuating levers comprises a clearance portion of relatively large width when measured in a plane transverse to the axis of said pivot shaft, the end of said control lever being situated in said clearance opening when it registers with the opening in said one of said other actuating levers whereby movement of each actuating lever can be accomplished independently upon rotation of said control element about the axis of said pivot shaft.

References Cited

UNITED STATES PATENTS

| | | | |
|---|---|---|---|
| 2,791,914 | 5/1957 | Cornelius | 74—527 |
| 3,192,793 | 7/1965 | Hurst et al. | 74—476 |

FRED C. MATTERN, JR., *Primary Examiner.*

JAMES A. WONG, *Assistant Examiner.*